Dec. 11, 1928.

E. FEJES 1,694,535

CRANK AND LIKE CASE

Original Filed Sept. 5, 1923

Inventor
Eugen Fejes
By Marks & Clerk
Attys.

Patented Dec. 11, 1928.

1,694,535

UNITED STATES PATENT OFFICE.

EUGENE FEJES, OF BUDAPEST, HUNGARY.

CRANK AND LIKE CASE.

Original application filed September 5, 1923, Serial No. 661,110, and in Germany October 13, 1922. Divided and this application filed August 12, 1926. Serial No. 128,868.

This invention relates to screw connections between the various plates of a crank or like casing of an internal combustion engine, some of which plates are made of thin metal sheet whilst others are comparatively thicker. The screw connections provided according to the present invention are used at those parts of the casing where two or more plates lying at right angles to one another have to be connected together. As the thickness of the plates is substantially smaller than the diameter of the connecting screw, it is not possible to fix the screw directly into a plate which is arranged parallel to the axis of the screw.

According to the present invention the plates which are arranged at right angles to one another are connected together by means of a metal block which is provided with welding fillets and a screw-threaded hole for the reception of a screw.

The invention is illustrated, by way of example, in the accompanying drawings in which, Figure 1 illustrates in perspective view and partly in section a crank casing of an internal combustion engine.

Figure 1:
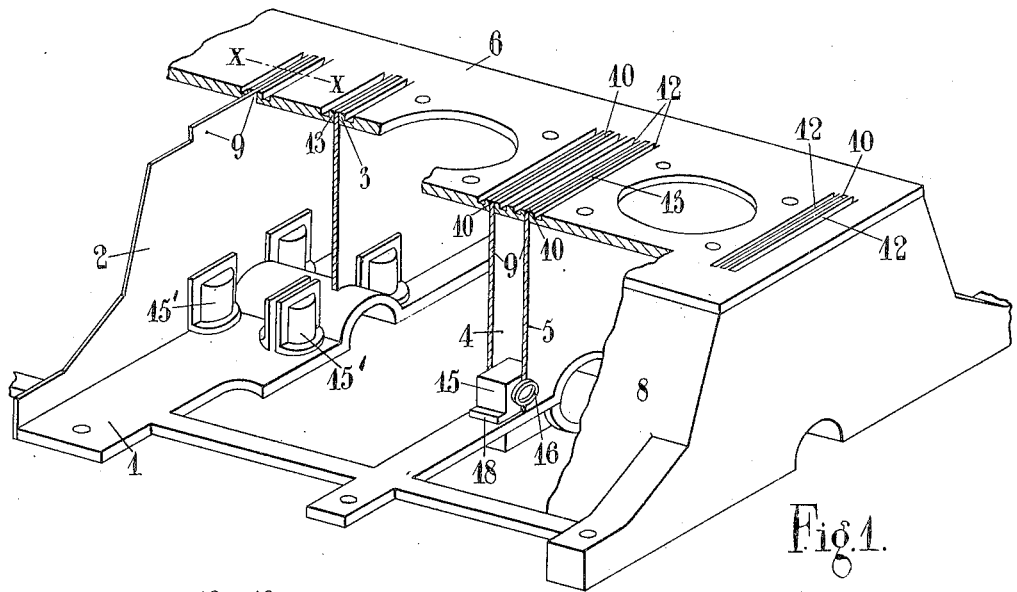

Referring to Figure 1, 1 is the sheet iron base of the crank casing 2, 3, 4 and 5 being supporting vertical sheet iron plates carrying the top plate 6, whilst 7 and 8 are two side plates of the crank casing. The vertical plates may be connected to the top plate in the manner described in the concurrent patent application Number 661,110, that is to say, by providing the top plate with slots 10 and forming the vertical plates with tongues 9 fitting in the said slots, the edges of the fillets and of ridges 13 formed in the top plate being welded together. The ridges 13 in the top plate 6 are formed by cutting grooves 12 on either side of the slot 10 at such a distance from the slot 10 as to leave a portion of metal of approximately the same thickness as the thickness of the vertical plates. A metal block 15 constituting a connecting "nut" is provided between two parallel supporting plates 4 and 5. On the sides facing the supporting plates the said "nut" is provided with an annular welding fillet 16 which has the same thickness as the supporting plates 4 and 5. The welding fillets engage in circular openings 19 formed in the supporting plates and are autogenously welded to the latter. A further welding fillet 18 is provided at the lower edge of the "nut" 15 by means of which welding fillet the "nut" is welded onto the base 1 of the casing. The "nut" 15 is further provided with a screw-threaded hole in which engages a screw by means of which the metal block is further secured to the base of the casing.

Figure 2:
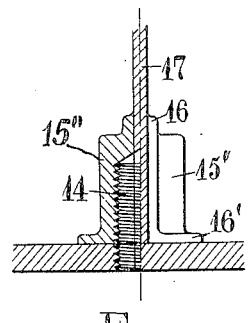
Figure 2 illustrates partly in elevation and partly in sectional elevation one form of construction of the improved screw device as applied to the connection between a vertical plate and an adjacent horizontal plate.

Use is preferably made of the modification illustrated in Figure 2 when a connection is to be effected between a vertical and a horizontal plate adjacent thereto. The "nut" 15 is subdivided into two parts 15 and 15' and the supporting plate 17 comes to lie between the two parts of the "nut" as will also be seen on the lefthand side of Figure 1. The two parts of the "nut" are also provided with welding fillets 16' which have the same thickness as the supporting plates to which they are secured by autogenous welding. The screw-threaded hole for the reception of the connecting screw is formed in the central plane of the supporting plate 17 so that the screw shall properly engage with both parts of the screw "nut."

Figure 3:
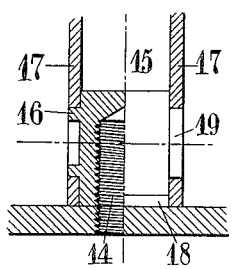
Figure 3 is a similar view as applied to a connection between two vertical plates and an adjacent horizontal plate.
Figure 4:
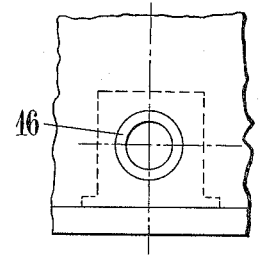
Figure 4 is an elevation of the construction shown in Figure 3.

Referring to the construction illustrated in Figures 3 and 4 the same shows more clearly the "nut" connection illustrated on the right-hand side of Figure 1.

Figure 5:
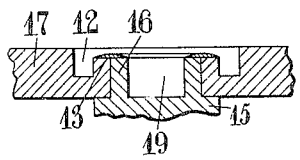
Figures 5 and 6 illustrate in sectional elevation and end view respectively a further modification of the improved screw device.
Figure 6:
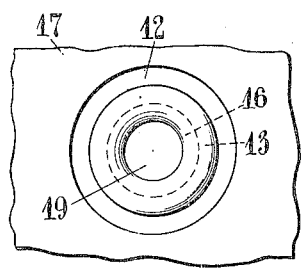

If the fillets and the plate to be connected thereto are not of the same thickness, in addition to the circular hole formed in the thick plate for the reception of the annular welding fillet of the "nut" an annular groove is formed around the said hole at such a distance as to leave a narrow ridge of substantially the same thickness as the annular welding fillet, the latter being edge-welded to the said annular ridge. This form of construction is illustrated in Figures 5 and 6 in which 19 is the circular hole, 16 the annular welding fillet of the "nut" 15, 13 the narrow annular ridge formed on the plate and 12 the annular groove formed adjacent to the ridge. For the production of the weld the latter is preferably located below the machining plane of the thick plate which is formed with the annular hole.

By this construction simultaneous fusion of the contacting parts is assured during the welding and since only local heating takes place the finished welded piece will practically not be distorted.

Other casing used in connection with internal combustion engines, such as gear cases may be constructed in the same manner as hereinbefore described.

What I claim is:—

1. In combination, thin and comparatively thicker plates lying at right angles to one another and connecting means between such plates, said connecting means including a metal block having a screwthreaded hole adapted to be engaged by a connecting screw and narrow welding fillets whereby the block is edge-welded to the plates.

2. In combination, plates of different thickness lying at right angles to one another and connecting means between such plates, said connecting means including a metal block having a screw-threaded hole adapted to be engaged by a connecting screw and a narrow welding annular fillet by which the block is edge-welded to one of the plates which latter plate has a circular hole for receiving such annular fillet.

3. An arrangement as claimed in claim 2 and in which the block also has a welding fillet by which it is edge-welded to a plate lying at right angles to the plate to which the block is edge-welded by the annular fillet.

4. In combination, thin and comparatively thicker plates lying at right angles to one another and connecting means between such plates, said connecting means including a metal block having a screwthreaded hole intended to be engaged by a connecting screw and a narrow welding annular fillet by which the block is edge-welded to one of the plates, which latter plate is comparatively thick and has a circular hole for the reception of the said narrow annular fillet, an annular ridge to which the said annular fillet is welded and an annular groove around the said ridge.

5. An arrangement as claimed in claim 4 and in which the weld along the edge of the annular welding fillet of the block and along the annular ridge, lies below the outer surface of the plate in the circular hole of which the annular fillet is fitted, for the purpose set forth.

6. In combination, plates of different thickness lying in angular relation to one another, and connecting means between said plates, said connecting means including a metal block having welded fillets edge-welded to certain of said plates, said metal block having a screw threaded hole adapted to be engaged by a connecting screw.

In testimony whereof I have signed my name to this specification.

EUGENE FEJES.